Figure 1:
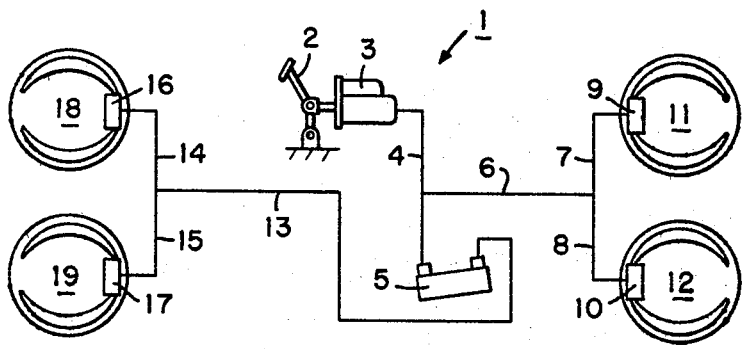

Aug. 27, 1968   A. N. MILSTER   3,398,757

INERTIA RESPONSIVE ANTISKID CONTROL VALVE

Filed Sept. 28, 1965   2 Sheets-Sheet 1

INVENTOR
ARTHUR N. MILSTER
BY
Joseph E. Papin.

Aug. 27, 1968  A. N. MILSTER  3,398,757

INERTIA RESPONSIVE ANTISKID CONTROL VALVE

Filed Sept. 28, 1965  2 Sheets-Sheet 2

INVENTOR
ARTHUR N. MILSTER
BY

United States Patent Office 3,398,757
Patented Aug. 27, 1968

3,398,757
INERTIA RESPONSIVE ANTISKID
CONTROL VALVE
Arthur N. Milster, Richmond Heights, Mo., assignor, by mesne assignments, to Wagner Electric Corporation, a corporation of Delaware
Filed Sept. 28, 1965, Ser. No. 490,865
14 Claims. (Cl. 137—38)

This invention relates to fluid pressure systems and more particularly to a control valve for use in such a fluid pressure system.

In the past, to compensate for the dynamic weight differential established between the front and rear brakes by the inertia weight shift toward the front of a vehicle during a braking application, and to thus minimize the danger of skidding the rear wheels, a ratio changing type control valve was provided in the vehicle fluid pressure system. These ratio changing type control valves have the general characteristics of permitting initial energization of the front and rear brakes, and thereafter establishing a fluid pressure differential between said front and rear brakes so that said front brakes could be energized by a greater amount than said rear brakes; however, these prior art control valves, after first permitting initial energization of the front and rear brakes, have the undesirable feature of not transmitting fluid pressure increases to said rear brakes until a predeterminately greater fluid pressure has been attained at said front brakes, so that a time period or "step" was established during which said rear brakes were ineffective in further assisting in the braking application. Thus, these prior art control valves did not effect a smooth, stepless transition into the fluid pressure differential between the front and rear brakes and a full utilization of braking effort was not obtained.

It is therefore the general object of the present invention to provide a novel control valve which overcomes the aforementioned undesirable feature.

Another object of the present invention is to provide a novel control valve which establishes a fluid pressure differential between the front and rear brakes immediately upon reaching a predetermined deceleration rate, and then maintains said fluid pressure differential in a smooth, stepless manner for more efficient utilization of braking effort.

Another object of the present invention is to provide a novel control valve for effecting a fluid pressure differential between vehicle front and rear brakes to compensate for the inertia weight shift of the vehicle during vehicle deceleration in response to braking effort and to more closely proportion the amount of braking force by the front and rear brakes to the dynamic weight on the front and rear wheels during a braking application.

Another object of the present invention is to provide a novel control valve having energy storing means therein which is loaded during initial energization of the front and rear brakes and which, upon the occurrence of a predetermined deceleration rate, thereafter unloads to assist in providing a smooth transition into a fluid pressure differential between the front and rear brakes.

Still another object of the present invention is to provide a control valve containing a ratio changing piston having opposed differential ends in constant pressure fluid communication with the inlet and outlet ports of said control valve, said piston being initially movable in a first direction to a stored energy position, and after a predetermined vehicle deceleration rate is obtained, said piston is movable in the opposite direction to release the stored energy and smoothly establish a differential in fluid pressure at said inlet and outlet ports.

Still another object of the present invention is to provide, in a vehicle fluid pressure, a control valve containing a ratio changing piston having opposed differential ends in constant pressure fluid communication with the inlet and outlet ports of said control valve, and resilient means loaded by the movement of said piston toward a stored energy position; and, after a predetermined vehicle deceleration is obtained, said resilient means is effective to release the stored energy assisting the movement of said piston in the opposite direction to establish a fluid pressure differential between said inlet and outlet ports, and said resilient means is thereafter ineffective in either aiding or restricting further movement of said piston after releasing the stored energy thereof.

Still another object of the present invention is to provide a control valve of simplified construction for ease and economy of manufacture.

These and other objects and advantages will become apparent hereinafter.

Briefly, the present invention comprises a control valve for a vehicle having a housing with a pair of ports therein, resiliently urged means movable between said ports, and deceleration responsive means for controlling pressure fluid communication between said ports, said resiliently urged means being initially movable to a stored energy position, said deceleration responsive means being movable in response to a predetermined vehicle deceleration to a position interrupting pressure fluid communication between said ports, and said resiliently urged means being thereafter movable to release the stored energy and establish a stepless fluid pressure differential between said ports.

Figure 2:
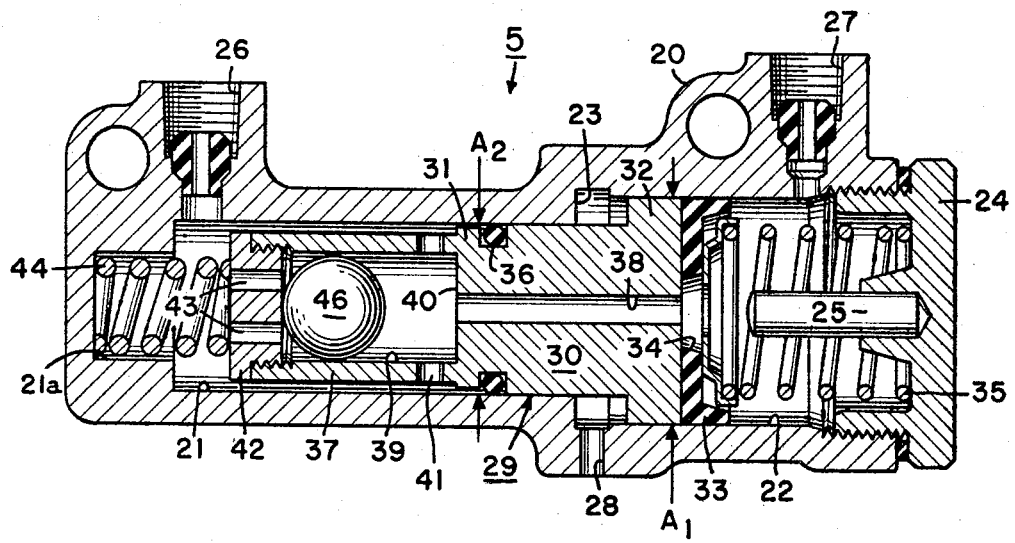
Figure 3:
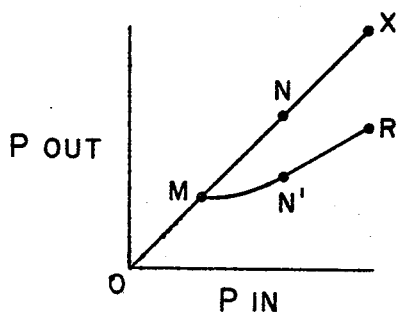
Figure 4:
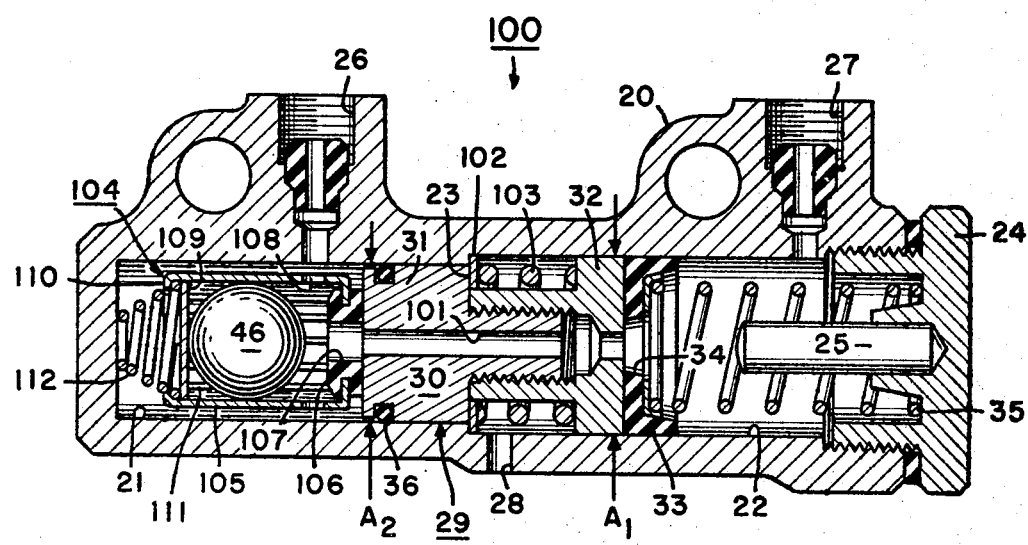
Figure 5:
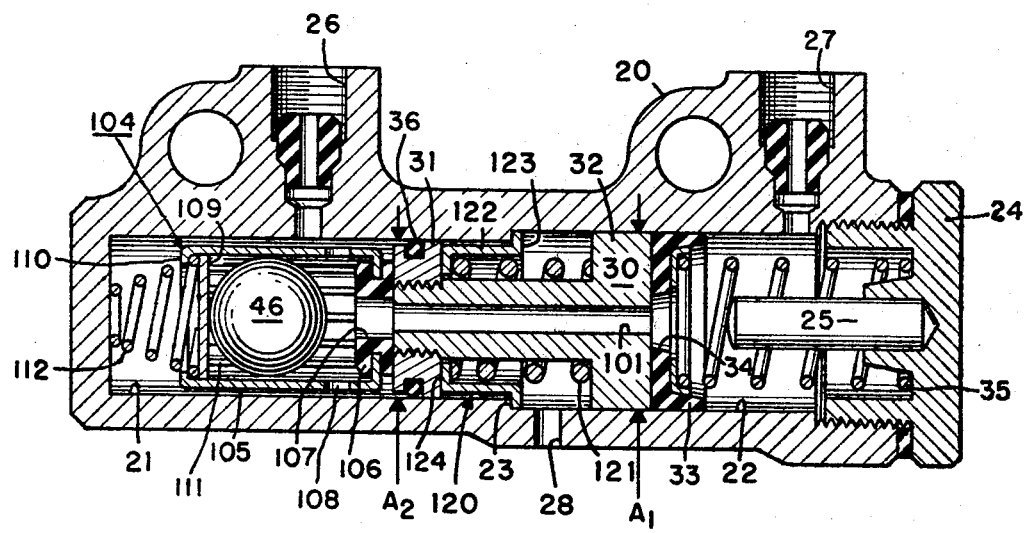

In the drawings which illustrate embodiments of the present invention,

FIG. 1 is a diagrammatic view of a fluid pressure system having a control valve therein embodying the present invention, FIG. 2 is a sectional view showing the control valve of FIG. 1 in cross-section, FIG. 3 is a graphical representation of the brake pressure of the fluid pressure system of FIG. 1 as effected by the control valve therein, FIG. 4 is a sectional view showing another embodiment of the present invention, and FIG. 5 is a sectional view of an alternative embodiment of the present invention.

Referring to the drawings in detail, and in particular to FIG. 1, a fluid pressure system 1 is provided with a brake pedal 2 operably connected with a fluid pressure generating means or master cylinder 3, and a delivery conduit 4 connects the master cylinder 3 with the inlet port of a ratio changing or control valve 5. A conduit 6 has one end intersecting the conduit 4 while the other end thereof branches at 7, 8 for connection with servo motors or wheel cylinders 9, 10 of front wheel brake assemblies 11, 12. Another conduit 13 has one end connected with the outlet port of the control valve 5 and the other end thereof branches at 14, 15 for connection with servo motors or wheel cylinders 16, 17 of rear wheel brake assemblies 18, 19. It should be noted that the control valve 5 is mounted at a predetermined angle inclined to the horizontal, with the inlet port at a lower elevation than the outlet port when the vehicle is on a level roadway.

Referring now to FIG. 2, the control valve 5 is provided with a housing 20 having an axially aligned bore and counterbore 21, 22 therein, and an abutment or radial shoulder 23 is provided at the intersection of said bore and counterbore. A recess or blind bore 21a connects with the leftward end of the bore 21 and is closed by the housing 20, and the rightward end of the counterbore 22 is closed by a closure member 24 threadedly received therein, said closure member including a stop member 25 which extends coaxially into the counterbore 22. An inlet port 26 which receives the conduit 4, as previously mentioned, is provided in the housing 20 connecting with the bore 21 adjacent to the leftward end thereof, and an outlet port 27 which receives the conduit 13, as previously mentioned, is also provided in the housing 20 connecting with the counterbore 22 adjacent to the rightward end thereof. A venting pasage 28 is provided in the housing 20 intersecting the counterbore 22 adjacent the radial shoulder 23.

A control or ratio changing piston, indicated generally at 29, is provided with a body portion 30 having opposed ends 31, 32 which are slidably received in the housing bore and counterbore 21, 22, respectively. A sealing cup 33 having a centrally located aperture 34 therein is sealably engaged between the rightward or larger piston end 32 and the housing counterbore 22, and a return spring 35 is biased between the closure plug 24 and the sealing cup 33 normally urging the piston 29 leftwardly. A peripheral seal 36 is provided on the piston body 30 adjacent to the mid-portion of the leftward or smaller piston end 31 in sealing engagement with the housing bore 21 and a reduced diameter portion 37 is provided on the piston end 31 extending from the leftward end thereof to a position leftwardly of the seal 36. An axial bore 38 is provided through the rightward end 32 of the piston body 30 and is substantially coaxial with the aperture 34 in the sealing cup 33. A counterbore 39 is provided through the leftward end 31 of the piston body 30 and connects with the leftward end of the bore 38 to provide an annular shoulder or valve seat 40 at the juncture thereof. A plurality of radially extending passages 41 are provided through the reduced diameter portion 37 adjacent to the radial shoulder or valve seat 40, and a retaining member 42 is threadedly received in the leftward end of the piston counterbore 39. A plurality of axial passages 43 are provided in the retaining member 42 connecting the housing bore 21 with the piston counterbore 39. An energy storing spring 44 is normally biased between the retaining member 42 and the leftward end of the recess 21a urging the piston 29 rightwardly and said spring is held in its operative position by the walls of the recess 21a. Therefore, when the opposing forces of the springs 35 and 44 exerted on the piston 29 are substantially equal, the piston 29 is held in its original position and the larger piston end 32 is spaced rightwardly from the housing shoulder 23 by a predetermined amount.

An inertia or deceleration responsive ball valve 46 is provided in the piston counterbore 39 for sealing engagement with the piston valve seat 40. With the control valve 5 mounted at an inclined angle to the horizontal, as previously mentioned, so that the inlet port 26 is lower than the outlet port 27, the ball valve 46 is normally in its leftward position at rest against the retaining member 42 and disengaged from the valve seat 40. To complete the description of the control valve 5, it should be noted that the rightward end 32 of the piston 29 slidable in the housing counterbore 22 is provided with an effective fluid pressure responsive area $A_1$ which is proportionally greater by a predetermined ratio than an opposing effective fluid pressure responsive area $A_2$ provided on the leftward end 31 of the piston 29 across the seal 36.

In the operation with the component parts of the control valve 5 in their normal positions, as shown in FIG. 2 and as described hereinabove, a manually applied force on the brake pedal 2 displaces pressure fluid from the master cylinder 3 through the conduits 4, 6, 7 and 8 into the wheel cylinders 9, 10 to initially energize the front wheel brake assemblies 11, 12. The displaced pressure fluid also flows from the conduit 4 through the inlet port 26 of the control valve 5 into the housing bore 21 and therefrom through the axial passages 43 of the retaining member 42 or the radial pasages 41 in the reduced piston diameter portion 37, the counterbore and bore 39, 38 in the piston body 30, and the aperture 34 of the sealing cup 33 into the housing counterbore 22. The displaced pressure fluid flows from the counterbore 22 through the outlet port 27 and conduits 13, 14 and 15 into the wheel cylinders 16, 17 to initially energize the rear wheel brake assemblies 18, 19 in a time sequence substantially simultaneous with the aforementioned energization of the front brake assemblies 11, 12.

During the initial energization of the front and rear brake assemblies 11, 12 and 18, 19, the fluid pressure of the displaced pressure fluid at the inlet and outlet ports 26, 27 of the control valve 5 is substantially equal. The fluid pressure at the inlet port 26 acts on the smaller effective area $A_2$ of the piston 29 to establish an input force $F_i$, and the fluid pressure at the outlet port 27 acts on the larger effective area $A_1$ of said piston to establish an output force $F_o$ in opposition to the force $F_i$ across the piston 29. Since the force $F_o$ is predeterminately greater than the force $F_i$, the piston 29 is urged leftwardly against the force $F_s$ of the energy storing spring 44, toward a pressure fluid displacement position, compressing or loading the energy storing spring 44 and increasing the force $F_s$ thereof. The energization of the front and rear brake assemblies 11, 12 and 18, 19 during the braking application establishes an inertia weight shift toward the front of the vehicle during deceleration, and the ball valve 46, in response to its inertia at a predetermined vehicle deceleration (established by the angle of inclination to the horizontal at which the control valve 5 is mounted when the vehicle is on a level roadway), rolls rightwardly relative to the piston 29 to a position sealably engaging the valve seat 40 thereby interrupting pressure fluid communication through the piston body 30 between the inlet and outlet ports 26, 27 of the control valve 5. With the ball valve 46 sealably engaging the piston valve seat 40 and interrupting pressure fluid flow through the piston body 30, the additive input force $F_i$ and spring force $F_s$ is balanced by the opposing output force $F_o$. As the input fluid pressure $P_i$ is increased above the value at which the ball valve 46 interrupted pressure fluid communication between the inlet and outlet ports 26, 27, the input fluid pressure $P_i$ acts on said ball valve to maintain it in sealing engagement with the valve seat 40, and the additive magnitudes of the input force $F_i$ and spring force $F_s$ exceed the magnitude of the output force $F_o$ thereby serving to concertedly move the piston 29 and ball valve 46 rightwardly in the housing bore and counterbore 21, 22 in a pressure fluid displacing direction to increase the output fluid pressure $P_o$ delivered to the rear brake assemblies 18, 19 in a ratio to the input fluid pressure $P_i$ as shown by the formula:

$$P_o = \frac{P_i A_2 + F_s}{A_1}$$

It should be noted that as the input fluid pressure $P_i$ is further increased and the piston 29 and ball valve 46 are urged rightwardly, the spring 44 releases its stored energy and the force $F_s$ is diminished due to the decompressing or unloading of the spring 44 and is finally eliminated upon the free length extension of said spring. With the force $F_s$ eliminated, the output fluid pressure $P_o$ is thereafter increased in a ratio to the input fluid pressure $P_i$ as shown by the formula:

$$P_o = \frac{P_i A_2}{A_1}$$

As illustrated by the graphical representation of the braking pressure in FIG. 3, the outlet fluid pressure $P_o$ from the control valve 5 to the rear wheel brake assemblies 18, 19 is at first in direct proportion (i.e., a 1:1 ratio) to the inlet fluid pressure $P_i$, as shown by the line OM. During the time the inlet and outlet fluid pressures $P_i$ and $P_o$ are in this direct proportion, the front and rear brake assemblies 11, 12 and 18, 19 are being energized substantially simultaneously to provide initial braking force for vehicle deceleration, and the piston 29 is simultaneously moving leftward to a pressure fluid displacing position loading or storing energy in the spring 44. The fluid pressure at point M is that attained at the inlet and outlet ports 26, 27 when the vehicle deceleration reaches the predetermined value at which the ball valve 46 rolls into sealing engagement with the valve seat 40 interrupting pressure fluid communication between the inlet and outlet prots 26, 27 of the control valve 5. With fluid pressure communication between the inlet and outlet ports 26, 27 interrupted, the ratio change between the input and output fluid pressures $P_i$, $P_o$ is effected as described hereinabove.

As the input fluid pressure $P_i$ is increased above the value M, as illustrated by the line MN, the input force $F_i$ is likewise increased, which is additive to the force $F_s$ of the spring 44 releasing its stored energy or unloading to move the piston 29 rightwardly in its pressure fluid displacing direction, thereby increasing the output fluid pressure $P_o$, as illustrated by the line MN', in the ratio of the first formula described hereinabove. The release of stored energy $F_s$ by the spring 44 has the effect of assisting in the establishment of simultaneous increases in the outlet fluid pressure $P_o$ in proportion to increases in the input fluid pressure $P_i$ which provides a smooth transition during the ratio change between the input and output fluid pressures $P_i$ and $P_o$. Thus, additional energization of the front and rear brakes 11, 12 and 18, 19, which is proportional to the input and output fluid pressures $P_i$, $P_o$, respectively, continues after the predetermined deceleration is obtained and the fluid pressure flow between said front and rear brakes is interrupted. When the input fluid pressure $P_i$ attains the value N, the piston 29 has moved rightwardly to a position where the spring 44 has released its stored energy and is now ineffective in assisting in further rightward movement of said piston. Therefore, as the input fluid pressure $P_i$ is increased above the value N, as illustrated by the line NX, a proportional increase in the output fluid pressure $P_o$ results, as illustrated by the line N'R, in the ratio of the second formula described hereinabove. In this manner, at a predetermined deceleration, the control valve 5 initiates a continuous ratio change between the input and output fluid pressures $P_i$, $P_o$ such that the fluid pressure at the front brakes 11, 12 is proportionally greater than the fluid pressure at the rear brakes 18, 19. Therefore, the front brakes 11, 12 are capable of applying a greater braking force than the rear brakes 18, 19 to compensate for the inertia weight shift toward the front of the vehicle during a braking application and to permit greater utilization of the front brakes without skidding of the rear wheels.

When the desired braking effect is obtained, the manually applied force is removed from the brake pedal 2, permitting the return flow of the displaced pressure fluid to the master cylinder 3. The front brake assemblies 11, 12 are de-energized by the return flow of pressure fluid from the wheel cylinders 9, 10 through the conduits 7, 8, 6 and 4 to the master cylinder 3. The removal of manual force also has the effect of eliminating the input fluid pressure at the inlet port 26 of the control valve 5, so that the force $F_i$ and the effect of the input fluid pressure $P_i$ urging the ball valve 46 rightwardly are eliminated. Also, due to the control valve 5 being mounted at the aforementioned angle of inclination to the horizontal, the force of gravity assisted by the outlet fluid pressure $P_o$ acting on the ball valve 46 causes it to roll leftwardly to its original position at rest against the retaining member 42 and disengaged from the valve seat 40. This again establishes pressure fluid communication between the inlet and outlet ports 26, 27 through the axial bore and counterbore 38, 39 in the piston body 30. With the axial bore 38 open, the output fluid pressure $P_o$ is eliminated, and the return spring 35 urges the piston 29 leftwardly to re-engage the energy storing spring 44 with the leftward end of the retaining member 42 and return the piston 29 to its original position balanced between the opposing forces of the springs 36 and 44. With the piston 29 and the ball valve 46 in their original positions, the rear brake assemblies 18, 19 are de-energized by the displaced pressure fluid flowing from the wheel cylinders 16, 17 through the conduits 15, 14 and 13 into the outlet port 27 of the control valve 5 and therefrom through the housing counterbore 22, the aperture 34 of the sealing cup 33, the axial bore and counterbore 38, 39 in the piston body 30, and the radial passages 41 in the piston portion 37 or axial passages 43 in the retaining member 42, and the housing bore 21, to the inlet port 26. The returning fluid flows from the inlet port 26 through the conduit 4 to the master cylinder 3 substantially simultaneous with the return flow from the front brake assemblies 11, 12, as previously described, to effect de-energization of the front and rear brake assemblies 11, 12 and 18, 19, at the same time.

Referring now to FIG. 4, another control or ratio changing valve 100 is shown having substantially the same component parts and functioning in the fluid pressure system 1 substantially in the same manner as the previously described control valve 5 with the following exceptions.

The opposed ends 31, 32 of the piston body portion 30 are threadedly connected and said body portion is provided with an axial bore or passage 101 through the opposed ends thereof. Also, the opposed ends 31, 32 confine or cage therebetween a washer or abutment member 102 and an energy storing spring 103 concentric with the periphery of the body portion 30. The spring 103 is held between the rightward or larger piston end 32 and the washer 102, normally urging said washer into abutting engagement with the leftward or smaller piston end 31. The washer 102 extends radially outwardly from the body portion 30 so that said washer is also abuttingly engageable with the housing shoulder 23. A ball cage assembly, indicated generally at 104, is provided in the housing bore 21 and is abuttingly engageable with the leftward piston end 31. A hollow cylindrical ball cage member 105 is provided with a valve seal or seat 106 molded on the rightward end of the cage 105, and the valve seal 106 is provided with a centrally located aperture 107 substantially coaxial with the axial bore 101 in the piston body 30. A plurality of radially extending passages 108 are provided through the rightward end of the cylindrical ball cage member 105 adjacent to the valve seat 106 and connect the housing bore 21 with the interior of the ball cage member 105. A retaining plate 109 is provided in the cylindrical ball cage member 105 adjacent the curled leftward end 110 thereof, and longitudinal ribs or flutes 111 are provided on the inside of said ball cage member which abut said retaining plate to prevent rightward movement thereof relative to said ball cage member. The flutes 111 are provided so that the ball valve 46 will freely roll between the retaining plate 109 and the valve seat 106 and said ball valve is normally at rest against said retaining plate and disengaged from said valve seat. A light return spring 112 has the rightward end thereof clamped between the curled leftward end 110 of the ball cage 105 and the retaining plate 109 and is normally biased between the retaining plate 109 and the leftward end of the housing bore 21 urging the ball cage 105 rightwardly to sealably engage the valve seal 106 with the piston end 31 about the axial passage 101. Since the force of the return spring 35 urging the piston 29 leftwardly is greater than the opposing force of the return spring 111 urging the ball cage 104 and the piston 29 rightwardly so that the piston 29 is originally balanced between the forces of the springs 112, 35, and the spring 103 urges the washer 102 into simultaneous abutting engagement with the housing shoulder 23 and the leftward piston end 31.

In the operation of the control valve 100, with the component parts in their original positions as shown in FIG. 4, the displaced fluid pressure at the inlet port 26 acts on the smaller effective area $A_2$ of the piston 29 to establish an input force $F_i$ in opposition across said piston to a predeterminately larger output force $F_o$ established by the fluid pressure at the outlet port 27 acting on the larger effective area $A_1$ of said piston. Since the output force $F_o$ is predeterminately greater than the input force $F_i$, the piston 29 and ball cage 104 are urged leftwardly toward their pressure fluid displacing positions. With the washer 102 and spring 103 caged between the opposed ends 31, 32 of the piston 29, and the washer 102 also in abutting engagement with the housing shoulder 23, leftward movement of the piston 29 gives the spring 103 the effect of being compressed between the housing shoulder 23 and the piston 29. Therefore, the leftward movement of the piston 29 toward its pressure fluid displacing position compresses or loads the energy storing spring 103 and increases its force $F_c$.

When the predetermined vehicle deceleration is attained, the ball value 46 rolls into sealing engagement with the valve seat 106 to interrupt pressure fluid flow through the piston body 30, and the input force $F_i$ additive to the force $F_c$ of the energy storing spring 103 is balanced by the opposing output force $F_o$. Thereafter, any increase in the input fluid pressure $P_i$ increases the magnitude of the input force $F_i$ which, additive to the force $F_c$, exceeds the magnitude of the output force $F_o$, thereby serving to move the piston 29 and ball cage member 104 rightwardly in the housing bore and counterbore 21, 22 in a pressure fluid displacing direction to increase the output fluid pressure $P_o$ delivered to the rear brake assemblies in a ratio to the input fluid pressure $P_i$, as shown by the formula:

$$P_o = \frac{P_i A_2 + F_c}{A_1}$$

It should be noted that as the input fluid pressure $P_i$ is increased, and the piston 29 and ball cage member 104 are urged rightwardly, the spring 103 releases its stored energy to assist in a smooth transition into the fluid pressure differential between the front and rear brakes and the spring force $F_c$ is diminished. As the piston 29 moves rightwardly, the smaller piston end 31 abuttingly engages the washer 102 and disengages said washer from the housing shoulder 23 to again cage the washer 102 and spring 103 between the opposed ends 31, 32 of the piston body 30. With the spring 103 and washer 102 caged or biased between the opposed ends 31, 32 of the piston body 30, the effect of the spring force $F_c$ in urging the piston 29 rightwardly is eliminated and the output fluid pressure $P_o$ is thereafter increased in a ratio to the input fluid pressure $P_i$, as shown by the formula:

$$P_o = \frac{P_i A_2}{A_1}$$

A modified or alternative embodiment of the present invention is shown in FIG. 5 having substantially the same component parts and functioning in the fluid pressure system 1 in substantially the same manner as the previously described control valve 100 with the following exceptions.

The opposed ends 31, 32 of the piston body 30 confine or cage therebetween an abutment member 120 and an energy storing spring 121 concentric with the periphery of the piston body portion 30. The abutment member 120 is provided with a body portion 122 coaxial with the energy storing spring 121 and radially outwardly from said energy storing spring and the piston body 30. The rightward end 123 of the abutment member 120 extends radially outwardly from the body portion 122 and is abuttingly engageable with the housing shoulder 23. The leftward end 124 of the abutment member 120 extends radially inwardly from the body portion 122 and is abuttingly engageable with the leftward or smaller piston end 31. The energy storing spring 121 is held between the rightward or larger piston end 32 and the leftward end 124 of the abutment member 120. When the piston 29 is in its original position, as previously described, the rightward end 123 of the abutment member 120 is abuttingly engaging the housing shoulder 23 and simultaneously the leftward end 124 of said abutment member abuttingly engages the leftward piston end 31. Therefore, the movement of the piston 29 leftwardly, as previously described, disengages the leftward end 124 of the abutment member 120 from the piston end 31 and the energy storing spring 121 is given the effect of being compressed between the housing shoulder 23 and the piston end 32. Also, the movement of the piston 29 rightwardly, as previously described, serves to re-engage the piston end 31 with the abutment member leftward end 124 and disengage the abutment member rightward end 123 from the housing shoulder 23, thereby giving the energy storing spring 121 the effect of being biased between the opposed piston ends 31, 32.

From the foregoing, it is now apparent that a novel control valve meeting the objects set out hereinbefore is provided and that changes or modifications as to the precise configurations, shapes and details of the construction set forth in the disclosure by way of illustration may be made by those skilled in the art without departing from the spirit of the invention as defined by the claims which follow.

The embodiments of the invention in which an exclusive property or privilege is claimed are defined as follows:

1. A control valve comprising a housing having a pair of ports therein, piston means having opposed ends movable in said housing between said ports, said opposed ends having differential effective areas respectively responsive to fluid pressure at said ports, passage means in said piston means through said opposed ends thereof and normally connecting said ports in pressure fluid communication, resilient means caged between said opposed ends and engageable with said housing, and inertia responsive means movable in said housing for controlling pressure fluid communication between said ports, said piston means being movable in a first direction compressing said resilient means between said housing and one of said opposed ends and disengaging the other of said opposed ends from said resilient means in response to established fluid pressure at said ports acting on said opposed ends differential areas to a stored energy position, said inertia responsive means being movable in response to a predetermined deceleration to a position closing said passage means and interrupting pressure fluid communication between said ports, and said piston means being thereafter movable in the opposite direction in response to increased fluid pressure at one of said ports acting on one of said opposed end areas and assisted by said resilient means release of stored energy until said other opposed end re-engages said resilient means to increase the fluid pressure at the other of said ports acting on the other of said opposed end areas in a predetermined ratio with the fluid pressure at said one port acting on said one opposed end area.

2. A control valve comprising a housing having a bore and counterbore therein, a shoulder on said housing between said bore and counterbore, inlet and outlet ports in said housing and respectively connected with said bore and counterbore, piston means slidable in said bore and counterbore between said inlet and outlet ports, said piston means having opposed inlet and outlet ends respectively responsive to fluid pressure at said inlet and outlet ports, a pair of abutments on said piston means adjacent to said inlet and outlet ends thereof, respectively, passage means in said piston means between the opposed inlet and outlet ends thereof connecting said inlet and outlet ports in pressure fluid communication, resilient means engaged between said pair of abutments and said housing shoulder, ball cage means movable in said housing bore and normally in abutting engagement with said piston means inlet end, and a ball valve movable in said ball cage means for controlling pressure fluid communication between said inlet and outlet ports through said passage means, said piston means being movable in a direction compressing said resilient means between one of said abutment means and said housing shoulder and disengaging the other of said abutment means from said resilient means in response to established fluid pressure at said inlet and outlet ports acting on said piston means inlet and outlet ends said ball valve being movable in response to a predetermined deceleration to a position in said ball cage interrupting pressure fluid communication between said ports through said passage means, and said piston means being thereafter movable in a direction opposite to said one direction in response to increased fluid pressure at said inlet port acting on said piston means inlet end and assisted by said resilient means until said other abutment means re-engages said resilient means to increase the fluid pressure at said outlet port acting on said piston means outlet end in a predetermined ratio with the increased fluid pressure at said inlet port acting on said piston means inlet end.

3. A control valve comprising a housing having a pair of ports therein, an abutment on said housing between said ports, piston means having opposed ends movable in said housing between said ports, said opposed ends having differential effective areas respectively responsive to fluid pressure at said ports, passage means in said piston means through said opposed ends thereof and normally connecting said ports in pressure fluid communication, resilient means normally engaged between said opposed ends and engageable with said housing abutment, cage means in said housing and concertedly movable with said piston means, a valve seal on said cage means normally in sealing engagement with said piston means about said passage means, and deceleration responsive means movable in said cage means for controlling pressure fluid communication between said ports, said piston means and said cage means being concertedly movable in one direction in response to initial increases in fluid pressure at said ports acting on said differential areas to a position disengaging one of said opposed ends from said resilient means and compressing said resilient means between said housing abutment and the other of said opposed ends, said deceleration responsive means being movable in said cage means in response to a predetermined deceleration to a position engaging said valve seal to close said passage means and interrupt pressure fluid communication between said ports, and said piston means and said cage means being thereafter concertedly movable in the opposite direction in response to increased fluid pressure at one of said ports acting on said one piston means end and assisted by the compressive force of said resilient means until said resilient means expands to a position disengaged from said housing abutment and re-engages with said one piston means end to increase the fluid pressure at the other of said ports acting on said other piston means end.

4. A control valve comprising a housing having a bore and counterbore therein and a radial shoulder at the juncture thereof, inlet and outlet ports in said housing and respectively connected with said bore and counterbore, piston means slidable in said bore and counterbore between said inlet and outlet ports, said piston means having opposed inlet and outlet ends respectively responsive to fluid pressure at said inlet and outlet ports, passage means in said piston means between said opposed inlet and outlet ends thereof connecting said inlet and outlet ports in pressure fluid communication, resilient means normally engaged between said opposed inlet and outlet ends and compressingly engageable with said housing shoulder, cage means in said housing bore normally engaging said piston means inlet end and concertedly movable with said piston means, a valve seat on said cage means and sealably engaging said piston means inlet end about said passage means, and deceleration responsive means in said cage means for sealing engagement with said valve seat, said piston means and said cage means being concertedly movable in one direction in response to initial increases in fluid pressure at said inlet and outlet ports acting on said piston means inlet and outlet ends to a position disengaging said resilient means from said inlet end and compressing said resilient means between said housing shoulder and said outlet end, said deceleration responsive means being movable in response to a predetermined deceleration to a position sealably engaging said valve seat to close said passage means and interrupt pressure fluid communication between said inlet and outlet ports, and said piston means and said cage means being thereafter movable in the opposite direction in response to increased fluid pressure at said inlet port acting on said inlet end and assisted by the compressive force of said resilient means until said resilient means expands to a position disengaged from said housing shoulder and re-engages with said inlet end to increase the fluid pressure at said outlet port acting on said outlet end establishing a fluid pressure differential between said inlet and outlet ports.

5. A control valve comprising a housing having a bore and counterbore therein and a radial shoulder at the juncture thereof, inlet and outlet ports in said housing and respectively connected with said bore and counterbore, piston means slidable in said bore and counterbore between said inlet and outlet ports, said piston means having oposed inlet and outlet ends respectively responsive to fluid pressure at said inlet and outlet ports, passage means in said piston means between said opposed inlet and outlet ends thereof connecting said inlet and outlet ports in pressure fluid communication, abutment means movable in said housing intermediate said opposed inlet and outlet ends and engageable with said housing shoulder, a spring engaged between said outlet end and said abutment means normally urging said abutment means into engagement with said inlet end and said housing shoulder, ball cage means movable in said housing bore and normally engaging said inlet end and concertedly movable with said piston means, a valve seat on said ball cage means and sealably engaging said inlet end about said passage means, and a ball valve movable in said ball cage means for sealing engagement with said valve seat, said piston means and said ball cage means being concertedly movable in one direction in response to initial increases in fluid pressure at said inlet and outlet ports to a position disengaging said abutment means from said inlet end and compressing said spring between said outlet end and said abutment means, said ball valve being movable in response to a predetermined deceleration to a position sealably engaging said valve seat to close said passage means and interrupt pressure fluid communication between said inlet and outlet ports, and said piston means and said ball cage means being thereafter concertedly movable in the opposite direction in response to increased fluid pressure at said inlet port acting on said inlet end to increase the fluid pressure at said outlet port acting on said outlet end establishing a fluid pressure differential between said inlet and outlet ports, and said piston movement in the opposite direction being initially assisted by the compressive force of said spring until said abutment means becomes disengaged from said housing shoulder and re-engaged with said inlet end to engage said spring between said opposed inlet and outlet ends.

6. A control valve comprising a housing, means reciprocally movable in said housing, other means in said housing including said first named means defining a pressure fluid flow passage through said housing, opposed means on said first named means defining opposed differential areas respectively responsive to fluid pressure in said flow passage, resilient means engaged between said opposed means and engageable with said housing, said first named means being movable against said resilient means upon the establishment of fluid pressure in said flow passage acting on said opposed differential areas toward a position disengaging one of said opposed means from said resilient means and containing said resilient means between said housing and the other of said opposed means, and deceleration responsive means movable in said housing for controlling said flow passage, said deceleration responsive means being movable in response to a predetermined deceleration toward a position closing said flow passage and isolating the fluid pressure acting on one of said opposed differential areas from the fluid pressure acting on the other of said opposed differential areas, said first named means being thereafter further movable in response to increases in the isolated fluid pressure acting on said one opposed differential area and assisted by the force of said resilient means until said one opposed means re-engages said resilient means to predeterminately increase the isolated fluid pressure acting on said other opposed differential area with respect to the increased isolated fluid pressure acting on said one opposed differential area.

7. The control valve according to claim 6, comprising a shoulder on said housing for engagement with said resilient means, said resilient means being contained between said shoulder and said other opposed means upon movement of said first named means toward its position disengaging said one opposed means from said resilient means.

8. The control valve according to claim 6, wherein said resilient means includes a spring having one end engaged with one of said one and other opposed means, and retainer means engaged with the other end of said spring and biased toward engagement with said housing and with the other of said one and other opposed means.

9. The control valve according to claim 8, comprising a shoulder on said housing for engagement with said retainer means, said retainer means being biased into engagement with said shoulder and said spring being contained between said retainer means and said one of said one and other opposed means upon movement of said first named means toward its position disengaging said other of said one and other opposed means from said retainer means.

10. The control valve according to claim 8, wherein said retainer means includes a sleeve portion substantially coaxial with said spring, first flange means on said sleeve portion for engagement between the other end of said spring and said other of said one and other opposed means, and second flange means on said sleeve portion spaced from said first flange means for engagement with said housing.

11. The control valve according to claim 10, comprising an annular shoulder on said housing for engagement with said first flange means, said first flange means being biased into engagement with said shoulder and said spring being contained between said second flange means and said one of said one and other opposed means upon movement of said first named means toward its position disengaging said other of said one and other opposed means from said second flange means.

12. The control valve according to claim 6, wherein said first named means comprises a piston movable in said housing and having opposed annular end flanges defining said opposed means, peripheral groove means in said piston intermediate said opposed end flanges, said peripheral groove means having opposed annular end walls, an annular shoulder on said housing, and said resilient means including a spring in said peripheral groove means substantially coaxial with said piston and having opposed ends, one of said opposed spring ends being engaged with one of said opposed end walls, and retainer means having a portion engaged with said housing shoulder and another portion engaged between the other of said opposed spring ends and the other of said opposed end walls.

13. The control valve according to claim 12, comprising passage means extending through said piston between said opposed end flanges and defining a portion of said flow passage, said deceleration responsive means including cage means movable in said housing with said piston and defining with said piston a valve seat about said passage means, and movable means in said cage means for engagement with said valve seat, said movable means being movable in response to the predetermined deceleration into engagement with said valve seat to close said passage means.

14. The control valve according to claim 13, comprising a bore and aligned counterbore in said housing defining with said passage means said flow passage, said housing shoulder being defined between said bore and counterbore, one of said end flanges being larger than the other thereof and slidable in said counterbore and said other end flange being slidable in said bore.

References Cited

UNITED STATES PATENTS

| 3,143,125 | 8/1964 | Stelzer | 137—38 |
| 3,143,379 | 8/1964 | Eksergian | 303—24 |
| 3,147,045 | 9/1964 | Stelzer | 137—38 X |
| 3,147,046 | 9/1964 | Stelzer | 137—38 X |
| 3,252,740 | 5/1966 | Stelzer | 303—24 X |

CLARENCE R. GORDON, *Primary Examiner.*